Figure 1:
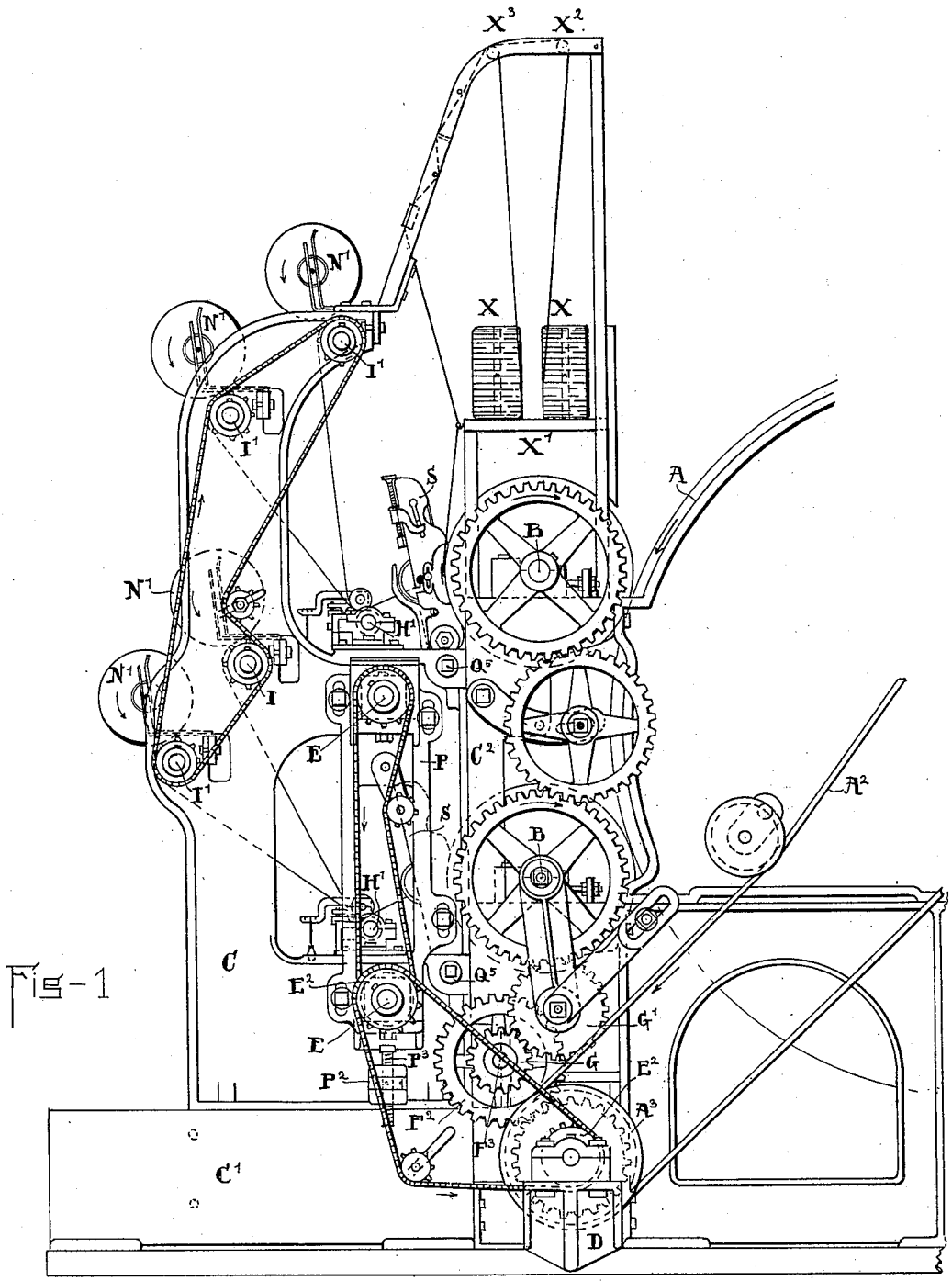

No. 763,378. PATENTED JUNE 28, 1904.
W. H. DRURY.
MACHINERY FOR MANUFACTURING YARN FROM FIBROUS MATERIALS.
APPLICATION FILED NOV. 2, 1903.
NO MODEL. 9 SHEETS—SHEET 1.

WITNESSES
Horace Toby
Charles Hafner

INVENTOR
William H. Drury
By Marcellus Bailey his Atty.

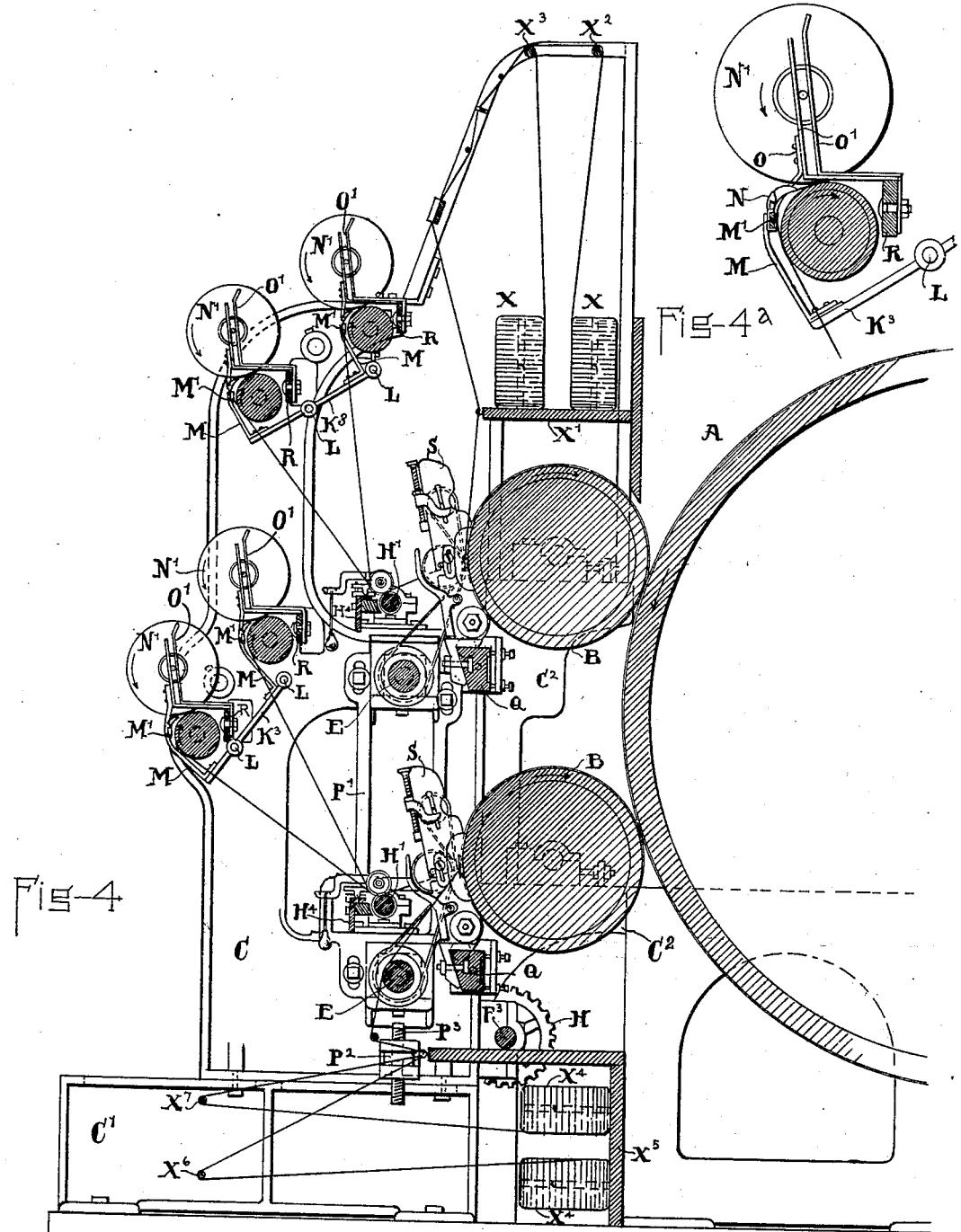

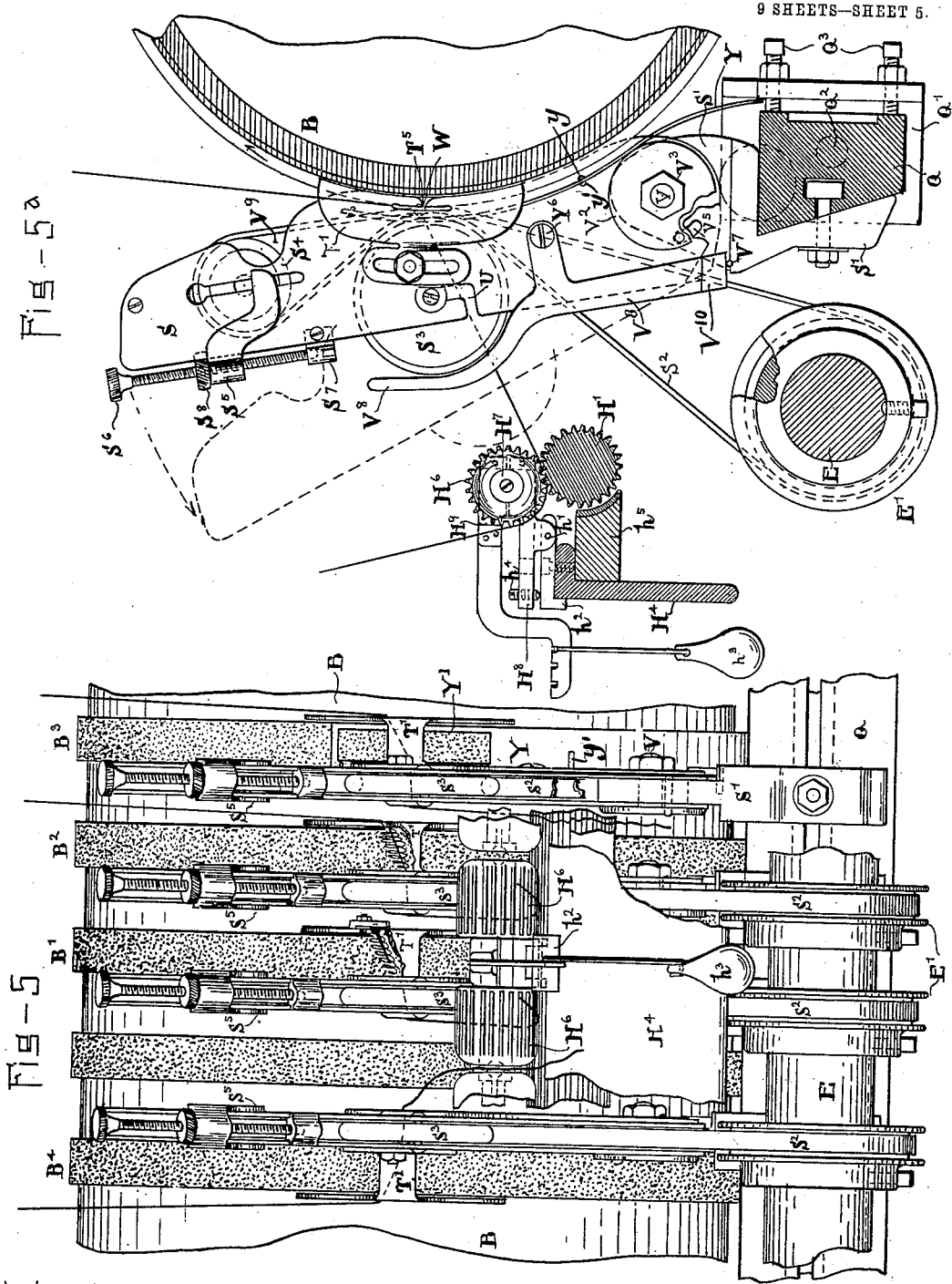

No. 763,378. PATENTED JUNE 28, 1904.
W. H. DRURY.
MACHINERY FOR MANUFACTURING YARN FROM FIBROUS MATERIALS.
APPLICATION FILED NOV. 2, 1903.
NO MODEL. 9 SHEETS—SHEET 6.
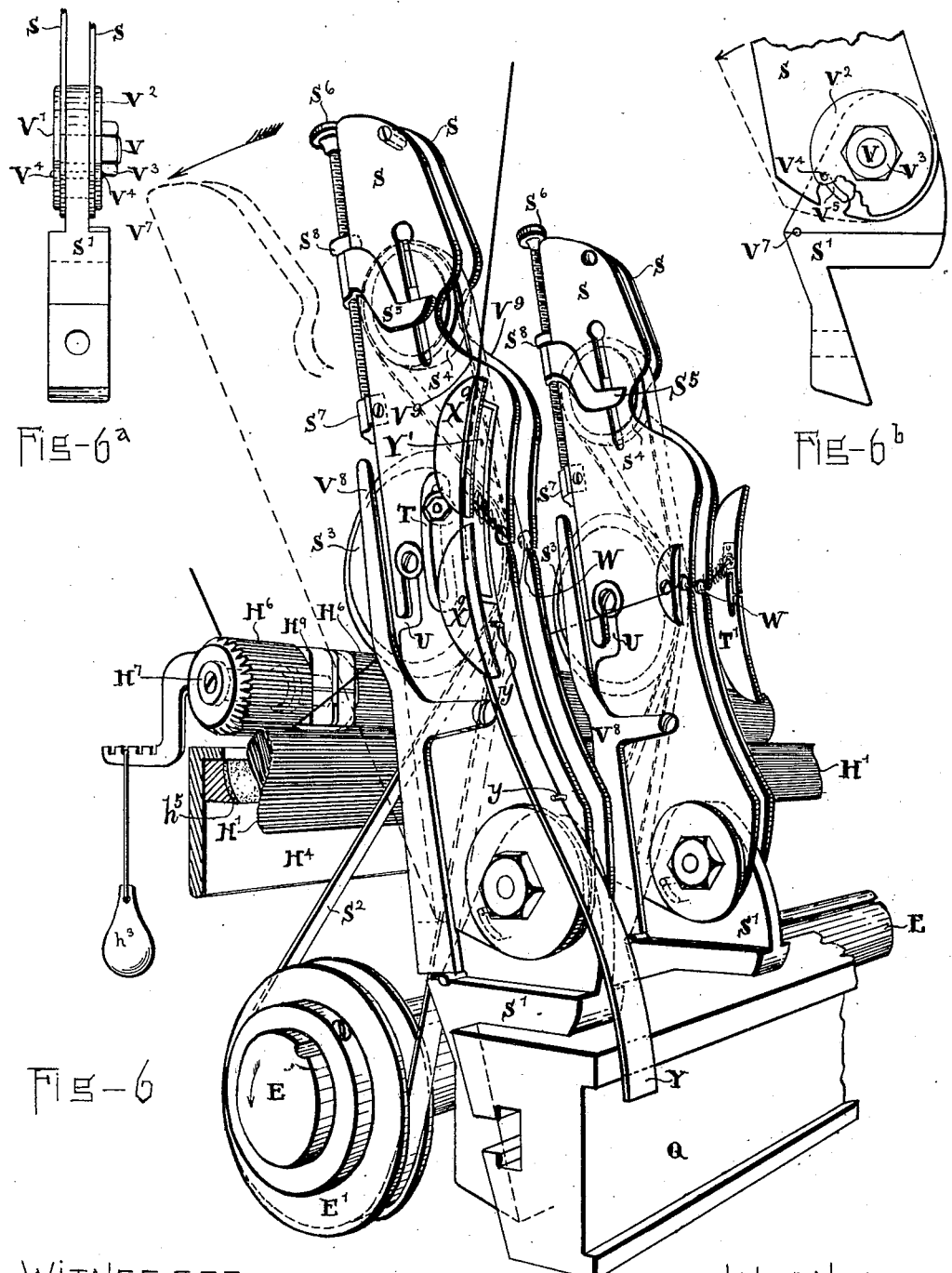
WITNESSES
Horace Tobey
Charles Hafner
INVENTOR
William H. Drury
By Marcellus Bailey his Atty.

No. 763,378. PATENTED JUNE 28, 1904.
W. H. DRURY.
MACHINERY FOR MANUFACTURING YARN FROM FIBROUS MATERIALS.
APPLICATION FILED NOV. 2, 1903.
NO MODEL. 9 SHEETS—SHEET 7.
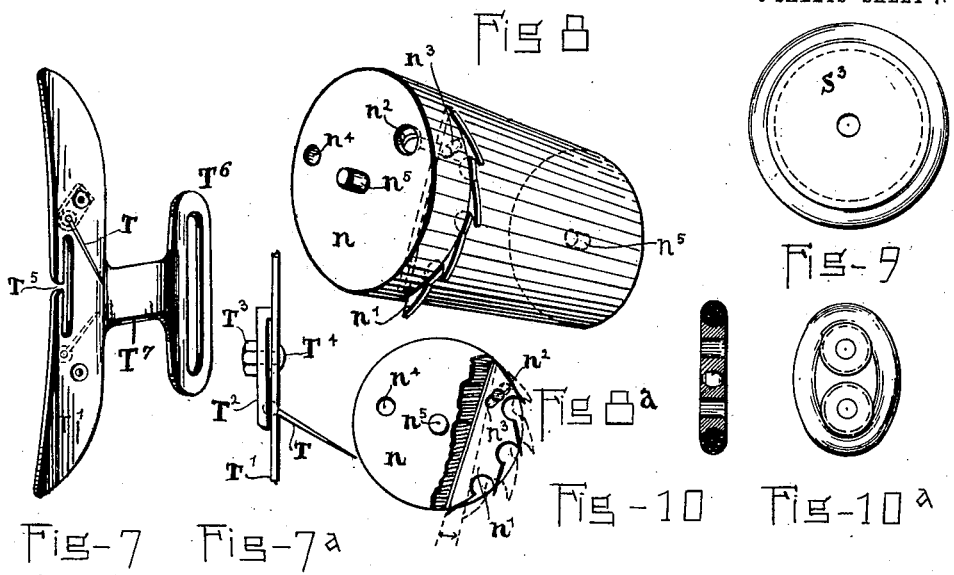
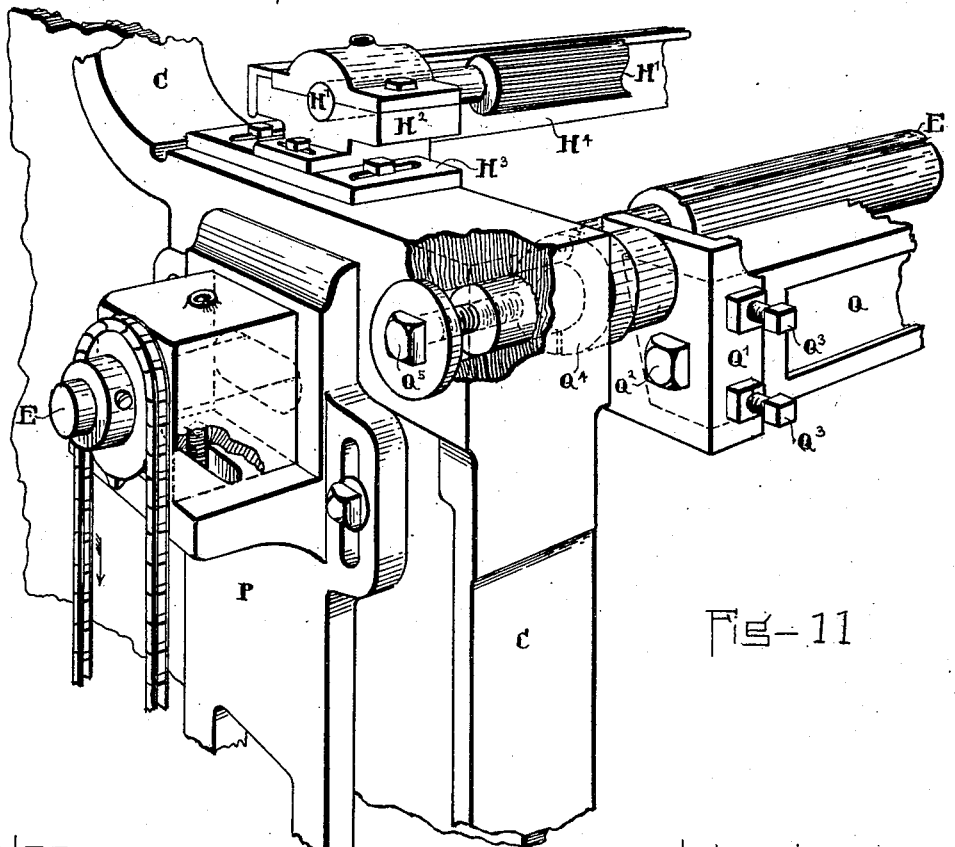
INVENTOR
William H. Drury

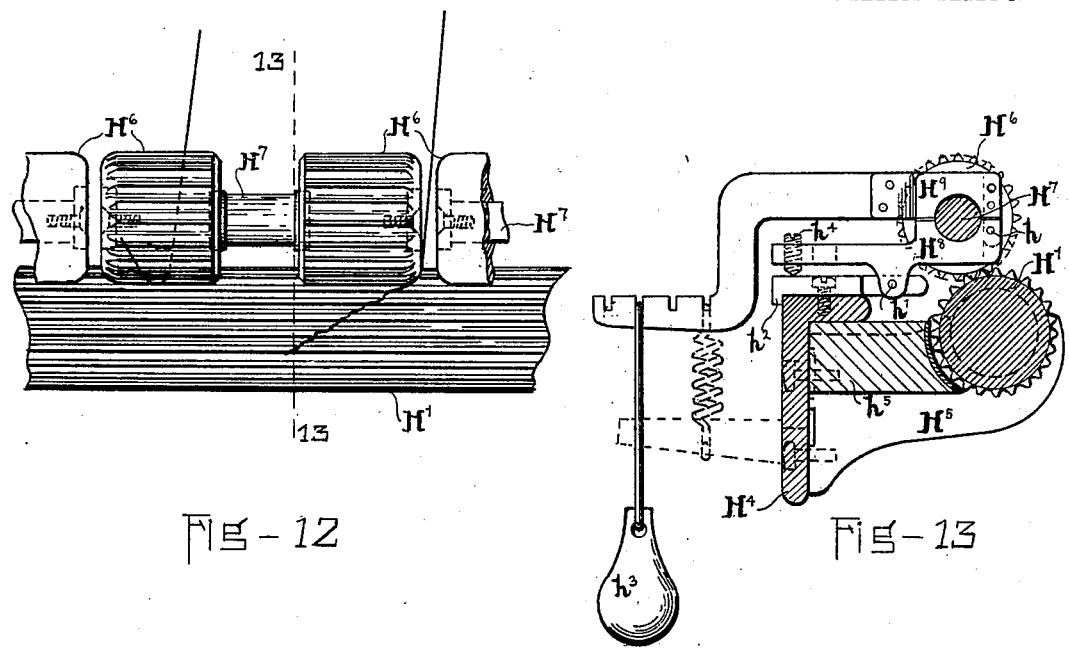
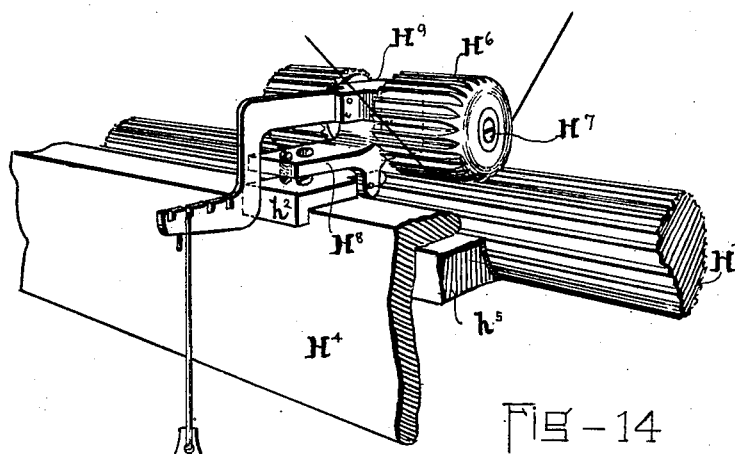
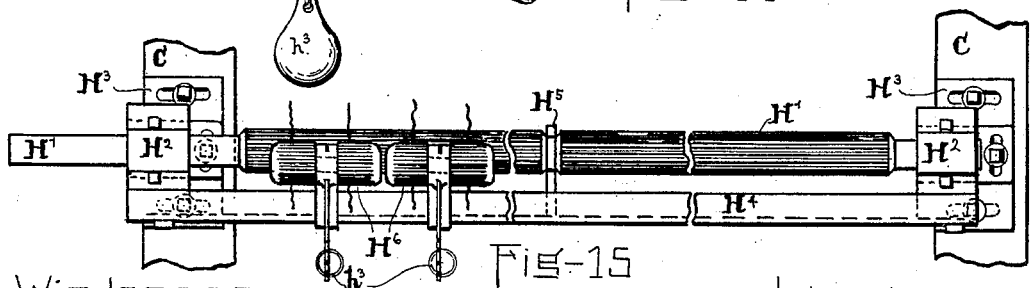

No. 763,378. PATENTED JUNE 28, 1904.
W. H. DRURY.
MACHINERY FOR MANUFACTURING YARN FROM FIBROUS MATERIALS.
APPLICATION FILED NOV. 2, 1903.
NO MODEL. 9 SHEETS—SHEET 9.
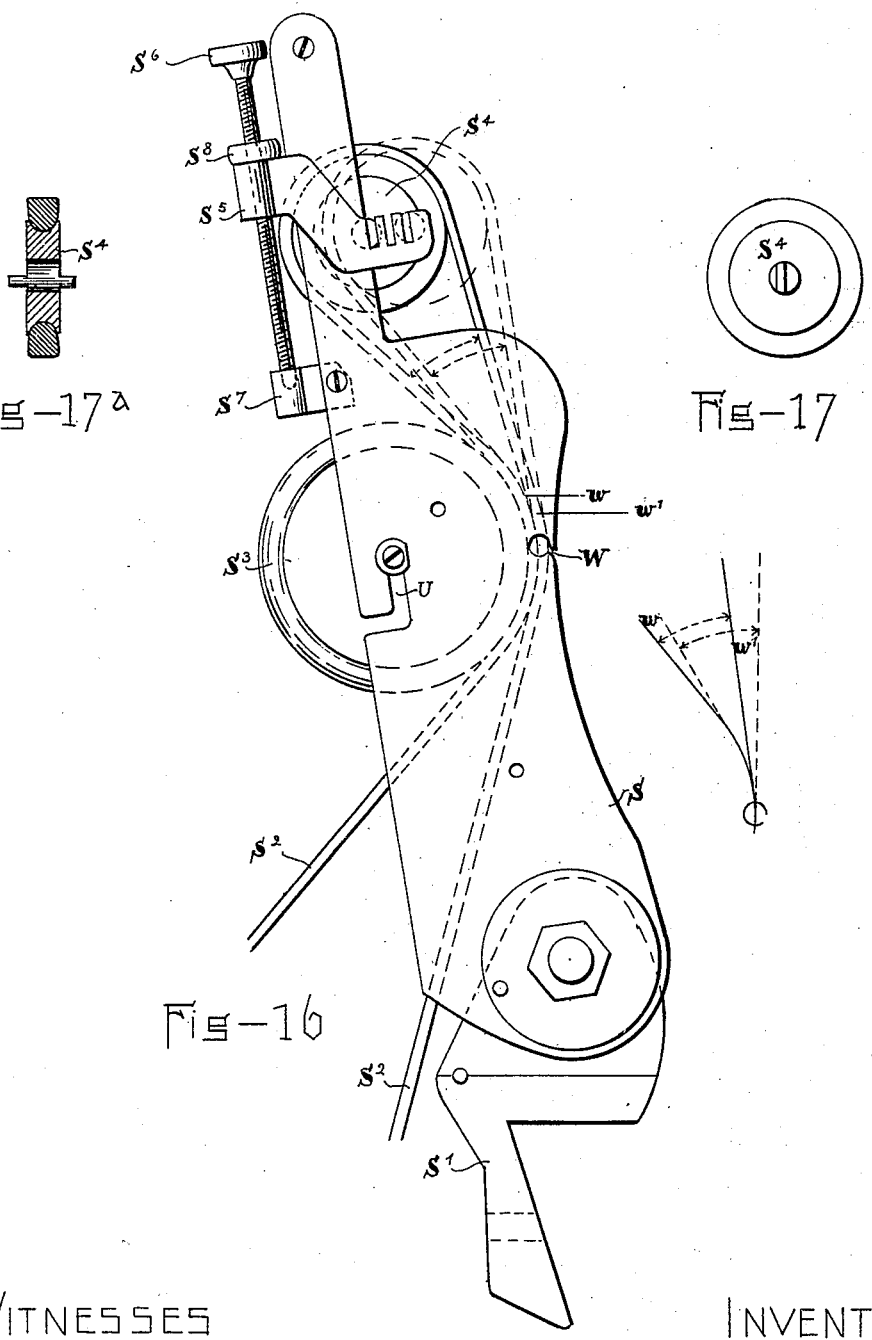
WITNESSES
Horace Tobey
Charles Hafner
INVENTOR
William H. Drury
By Marcellus Bailey his Atty.

(No. 763,378.) Patented June 28, 1904.

UNITED STATES PATENT OFFICE.

WILLIAM HENRY DRURY, OF WALTHAM, MASSACHUSETTS.

MACHINERY FOR MANUFACTURING YARN FROM FIBROUS MATERIALS.

SPECIFICATION forming part of Letters Patent No. 763,378, dated June 28, 1904.

Application filed November 2, 1903. Serial No. 179,631. (No model.)

*To all whom it may concern:*

Be it known that I, WILLIAM HENRY DRURY, of Waltham, in the county of Middlesex and State of Massachusetts, have invented certain new and useful Improvements in Machinery for Manufacturing Yarn from Fibrous Materials, of which the following is a specification.

In my Letters Patent No. 611,108, of September 20, 1898, I have described and claimed machinery for making spun yarn from fibrous materials in one continuous operation or series of operations, comprising the combination, with means for carding or straightening the fibers, of means to continuously subdivide the carded material into numerous narrow and independent sections, to continuously form or roll up these sections into fibrous rolls and to continuously draw these rotating rolls severally as they form lengthwise of themselves into yarn, and to condense and spin them simultaneously with drawing them. In my Letters Patent No. 611,109, of the same date, relating to machinery of the same general kind, I show and describe, among other things, special means for condensing and spinning the fibrous rolls, comprising the combination, with the doffer-rings, of vertically-arranged power-driven condensing or spinning straps, (one for each doffer-ring,) between the meeting faces of which the fibrous material is spun, these straps being located beside their respective doffer-rings opposite to the intervals between the rings, with their meeting faces in a plane tangential, or nearly so, to their respective doffer-rings.

My present invention involves the same general combination of instrumentalities having the same general mode of operation as in my Letters Patent aforesaid.

It consists in certain improvements thereon which simplify the construction of the machine, enhance its efficiency, and permit the several active operating mechanisms to be manipulated expeditiously and safely, these improvements having to do, primarily, with the spinning devices.

Another improvement provided by this invention is one whereby a new and useful yarn called "core-yarn" may be produced at will with the aid of substantially the same machinery. This yarn has the external characteristics of ordinary yarn and is composed of a central core which has been spun independently of the outer portion of the yarn and of a fibrous envelop evenly surrounding and spun upon this core and is the subject of my separate application filed in the United States Patent Office December 13, 1902, Serial No. 135,157. By the improvement here referred to yarn or thread which has been spun independently of the fibrous material, being delivered from the doffer-rings is used both to assist in making such core-yarn and also to enter into its completed structure as its central core.

The improvement consists in providing suitable cores and employing appropriate means to guide the same severally on predetermined lines across the surfaces of the respective doffer-rings in such proximity thereto as to graze said surfaces, and thence into and away from the field of action of the meeting faces of the spinning-straps and into the action of the drawing mechanism. The drawing mechanism draws said cores continuously along the lines on which they are thus guided, and said cores while being so drawn rotate, by the action of the spinning-straps, with great rapidity upon the surfaces of the doffer-rings and roll up and form from the fibrous material aforesaid upon and around themselves, enveloping fibrous rolls which by the action of said straps rotate rapidly around and with the cores which they envelop, and said enveloping fibrous rolls are drawn with said cores continuously between the meeting faces of said straps and are thereby compressed and spun upon their respective enveloped cores and are drawn thence with their cores in numerous strands of completed yarn having the characteristics and structure aforesaid.

My improvements will now be described more particularly in connection with the accompanying drawings, in which—

Figure 2:
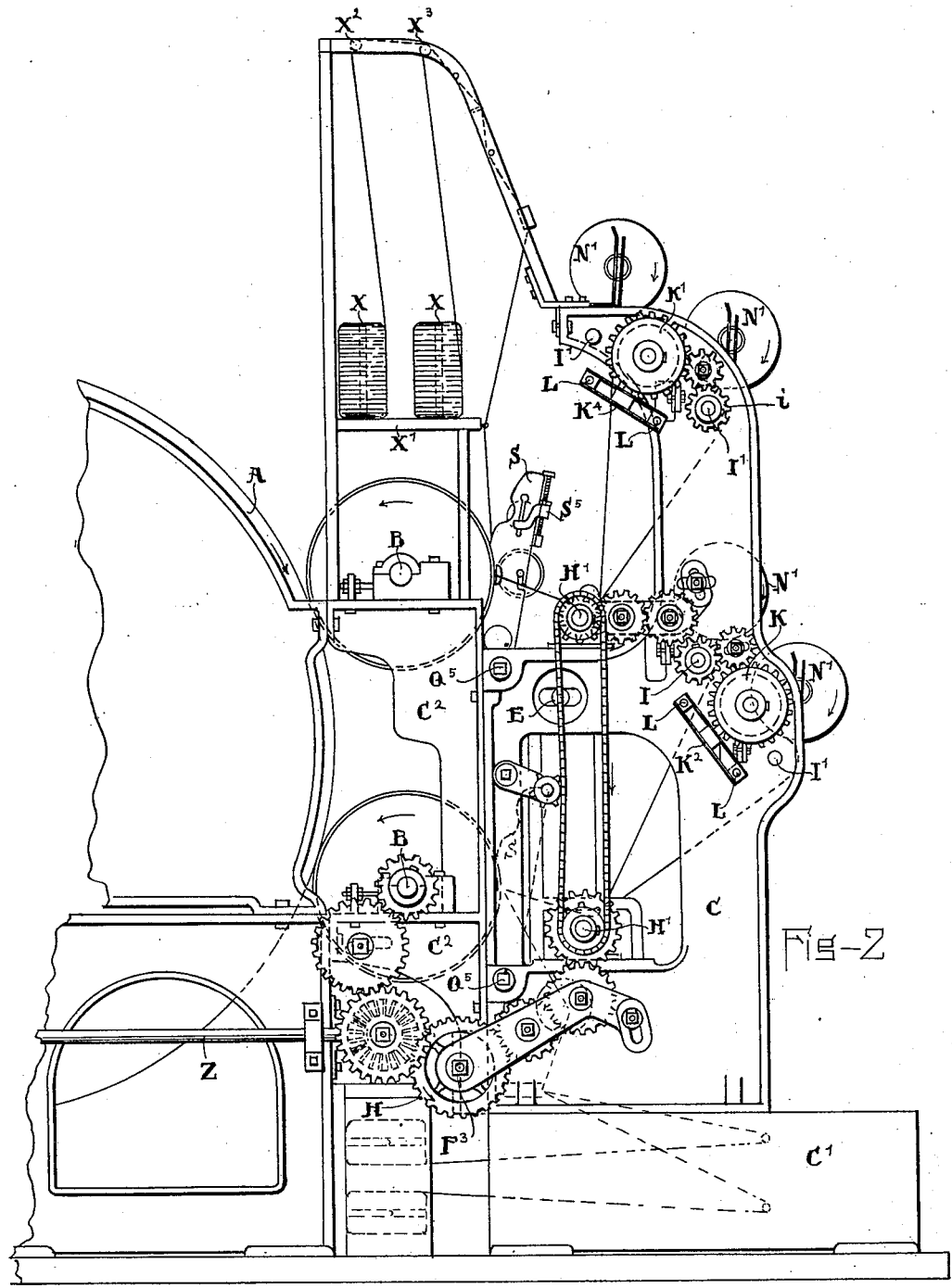
Figure 3:
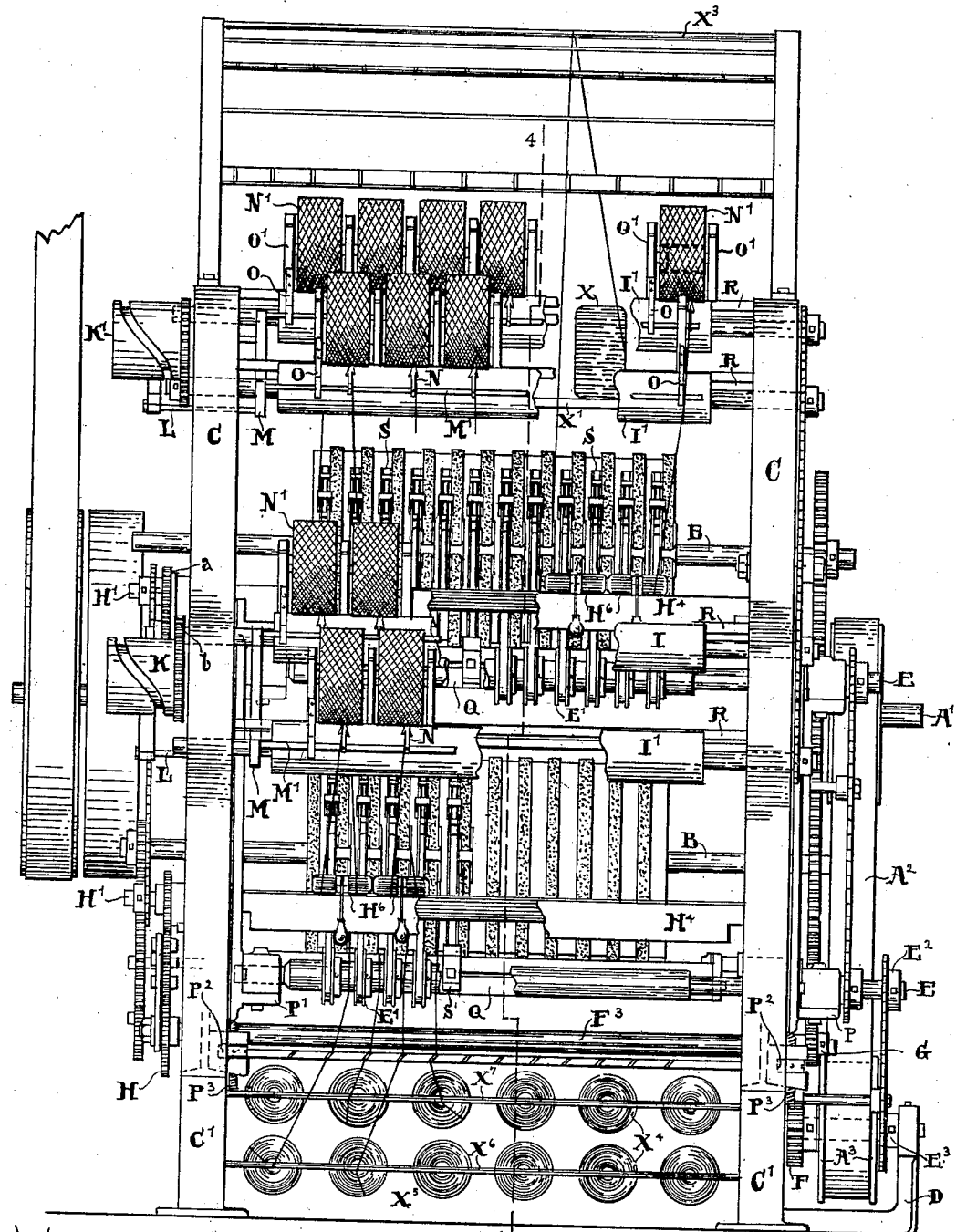

Figure 1 is a side elevation of so much of a machine for manufacturing yarn as needed to illustrate my improvements. Fig. 2 is an elevation of the opposite side of the machine. Fig. 3 is an elevation of the same looking at the delivery end, some of the parts being omitted or broken away for clearness of illustration. Fig. 4 is a longitudinal vertical section of the machine on line 4 4, Fig. 3. The foregoing are the more general views of the machine. The figures that follow are on a larger scale and are designed to illustrate details of structure and arrangement. Fig. 4$^a$ is a view illustrating the means for supporting the finger-bars which carry the traversing-fingers of the winding mechanism. Figs. 5 and 5$^a$ are a delivery end elevation and a longitudinal vertical section of portions of the spinning and drawing devices. Fig. 6 is a perspective view of two of the spinning-frames and their accompaniments, together with a portion of the girder which supports them. Figs. 6$^a$ and 6$^b$ are respectively an end elevation and a side elevation of the lower portion of one of the spinning-frames and the bracket or foot to which it is jointed. Fig. 7 is a perspective view of one of the needle-shields and the adjustable needle carried thereby for aiding the spinning-straps in their work. Fig. 7$^a$ is a view illustrative of the ball-and-socket joint by which the needle is held to the shield. Fig. 8 is a perspective view of one of the mandrels used in the winding mechanism to hold the paper tubes on which the yarn is wound. Fig. 8$^a$ is an end elevation of said mandrel with a portion broken away to show more clearly the arrangement of the pronged detent therein. Fig. 9 is a view of one of the circular "strap-guides," so-called, provided with a rubber tire and used to hold together the meeting faces of its appropriate spinning-strap. Figs. 10 and 10$^a$ are a cross-section and a side elevation, respectively, of a modification of the strap-guide. Fig. 11 is a perspective view of a portion of the machine-frame and associated parts, designed more particularly to illustrate the construction and arrangement of the spinning-frame-supporting girders and of the spinning-shafts and their bearings and of the drawing mechanism. Fig. 12 is a front elevation of one pair of upper drawing-rolls, together with a portion of the lower drawing-roll. Fig. 13 is a section on line 13 13, Fig. 12, showing also in section the drawing-roll-supporting frame or girder. Fig. 14 is a perspective view of the same. Fig. 15 is a plan illustrative of a complete set of drawing devices, together with the girders supporting the same and means for adjusting the same, whereby the set of drawing-rolls as a whole can be bodily adjusted either fore and aft or crosswise of the machine. Figs. 16, 17, and 17$^a$ are views of one of the spinning-frames and its associated parts illustrative of a modification by which provision is made for the horizontal fore-and-aft adjustment of the tension-idler S$^4$ of the spinning-strap.

The carding machinery used in connection with my system of making yarn does not differ from that in ordinary use, and hence only so much of it is represented in the drawings as will show its relation to those devices in which my present invention is more particularly comprised.

It is sufficient to say here that the carding-machine, in connection with which my improvements are in the present time actually in use is an ordinary finisher-card of the woolen system with a swift or main cylinder forty-eight inches in diameter and forty-eight inches long and two ring-doffers twelve inches in diameter and twenty inches apart between the axis of one and the axis of the other. On each ring-doffer are twenty-four doffer-rings two inches apart between the middle line of one and the middle line of the next, and each doffer-ring is thirteen-sixteenths of an inch wide, the intervals between the rings being nineteen-sixteenths of an inch wide. In Fig. 3 the ring-doffers are supposed to be twenty-four inches long and twelve inches in diameter with twelve rings on each to accompany a card whose main cylinder is twenty-four inches long and forty-eight inches in diameter. These dimensions, however, are adopted here for convenience only and to save room in the drawings.

The ring-doffers are constructed, clothed, packed, and arranged in all respects the same as ordinary ring-doffers when two are used in connection with a finisher-card of the woolen system.

In the drawings, A represents a portion of the swift or main cylinder of the card, A', Fig. 3, its shaft, B the ring-doffers or their shafts, whose supports are on a single casting bolted to the side frames C, which support the spinning, drawing, and winding machinery and rest on the foundations C', which may be a part of the framework, if preferred.

The motion for driving the spinning, the drawing, and the winding mechanisms and the doffers is taken from shaft A' of the main carding-cylinder by a belt A$^2$, running to a flanged pulley A$^3$, the shaft of which is journaled in boxes in a casting D.

To the actuating-shafts E of the two sets of spinning mechanisms motion is communicated, by means of a sprocket-chain and gearing, from the shaft of pulley A$^3$ to the lower one of the two shafts E and then by similar sprocket-chain and gearing from the lower shaft E to the upper shaft E, as shown in Fig. 1.

The ring-doffers are driven as follows: On the shaft of pulley A$^3$ is a gear F, Fig. 3, which drives a gear F$^2$, Fig. 1, on one end of a shaft F$^3$. On this end of shaft F$^3$ is another gear G, which meshes with a gear-wheel G', from which the upper and lower doffer-shafts B B are driven by suitable gearing-train, as indicated in Fig. 1.

To drive the two sets of drawing-rolls, the shaft F$^3$, which extends across the machine, has on that end of it which is seen in Fig. 2 a toothed wheel H, which through a suitable train of gearing drives the under drawing-roll H' of the lower set, which in turn drives the under drawing-roll H' of the upper set by sprocket-chain and gearing, as shown.

The winding mechanism is driven as follows: On the under shaft H' of the upper set of drawing-rolls is a gear $a$, (hidden from view in Fig. 2, but seen in Fig. 3,) which, through a suitable train of gearing, as indicated in Fig. 2, drives the drum-shaft I. The winding-spools are divided into four sets of six each, and as there is one drum-shaft for each set there are four drum-shafts in all. The other three designated I' are all driven from drum-shaft I by sprocket-chain and gearing, as indicated in Fig. 1. The spools N' rest on and are revolved by these drum-shafts, while the yarn is laid on and distributed by suitable traversing guide-fingers. These traversing fingers N, Figs. 3 and 4, are in the two lower sets of winding devices mounted at opposite sides of the traverse-frame on bars M', forming part of said frame, the other portions of the frame consisting of rods L and the arms $M K^3$, connecting said rods with the finger-bars M'. The rods L of the frame extend through bosses in the side frame of the machine and are capable of a reciprocating movement crosswise of the machine. This reciprocating movement is imparted to it by means of a peripherally-grooved cam K, driven from drum-shaft I by a gear $b$, (partly seen in Fig. 3,) which groove is engaged by a roller-stud on the traverse-frame.

The two upper sets of traverse-fingers are mounted upon a like frame and are driven in a like way from a cam K', which takes its motion from one of the drum-shafts I'. The traverse finger-bars M' are sustained and upheld in their movement by supports O, through which they pass, said supports being attached to the mandrel-guides O'. Extending across the machine between the sides C are the two girders Q for supporting the spinning-frames. The upper girder carries the set of spinning-frames which coöperate with the upper ring-doffer, and the lower girder carries the set of spinning-frames which coöperate with the lower ring-doffer. There are twelve spinning-frames in each set, corresponding in number to the number of rings on each doffer.

The spinning-frames are mounted on and secured to the girders in the manner indicated in my Patent No. 611,109—that is to say, their feet or brackets S' are bolted to the girders by bolts whose heads fit and can slide in longitudinal undercut or T-shaped slots in the girders—thus permitting the individual adjustment of the spinning-frames whenever necessary.

All the spinning-frames are alike, as also are the spinning devices carried by the same. Therefore a description of one will answer for all.

Referring more particularly to Figs. $5^a$, 6, $6^a$, $6^b$, each spinning-frame consists of a foot-piece S' and two side plates S, which are secured to the foot preferably in a way to permit the body of the frame to be moved to and from its doffer-ring, as hereinafter described, these plates being also secured together by spacing studs at a distance apart a little greater than the width of the spinning-strap which is received between them.

The spinning-strap, as shown at $S^2$, passes over a tension-idler $S^4$, rotatable on its axle in the upper part of the spinning-frame between the two side plates, and at the bottom passes under and around the flanged pulley E', (on the spinning-shaft E,) by which it is driven, said pulley having, preferably, a rubber tire.

The tension-idler $S^4$ is a wheel, preferably rubber-tired, which is so mounted in the frame that it may be adjusted in order to increase or decrease the tension on the strap as desired. For this purpose in the present instance its axle is held in vertical slots in the side plates S and rests upon the arms of a fork $S^5$, having a screw-threaded nut through which passes the adjusting thumb-screw $S^6$, whose lower end is stepped in a bearing $S^7$, rigidly fixed to the spinning-frame.

$S^8$ is a lock-nut to prevent the adjustment from being disturbed.

In lieu of employing a flat metal stationary block, as in my Patent No. 611,109, to hold the faces of the strap together where they should meet I make use for this purpose of a rotatable circular or equivalently-formed strap-guide $S^3$, which is mounted between the side plates S and which will revolve by contact with the moving strap and which will always present a curved periphery where the meeting faces of the strap are. The strap-guide $S^3$ in Figs. $5^a$, 6, &c., has the form of a wheel with a rubber or other flexible, elastic, and yielding rim having a periphery curved in cross-section. This is the device which on the whole I prefer to use; but it will be understood that no tire need be employed or that if employed it need not be rounded in cross-section and that the structure of the device may be modified in other respects without departing from my invention. It may, indeed, be stationary instead of rotatable so long as it presents a curved periphery to the strap.

The general arrangement of the spinning-strap relatively to its doffer-ring is substantially the same as that set forth in my patent, save that the meeting faces of the strap instead of being in a plane are on a curve approximately tangential to the doffer-ring. The advantages of this construction over the flat block of my aforesaid patent are very considerable. When the meeting faces are on a curve, they confine their action more to the less lost motion, and the strap may be kept on looser tension and be driven with less power and with less friction upon it. The yarn going between the meeting faces keeps them slightly apart along the whole of the curved area, acting like a pulley or roller between them, confining their action mainly to the yarn itself and preventing them from rubbing against each other hard enough to become heated, a disadvantage to which my former arrangement was liable, and when, as I prefer, my improved strap-guide is rotatable the friction and consequent heating between the guide and the exterior of the strap is also avoided.

The rim of the strap-guide is preferably rounded or convex in cross-section, because in that case it will press harder against the strap along its middle length than along its edges, so that the meeting faces of the strap next its edges will yield apart to permit the yarn to enter between them easily and to easily turn its course on going out from between them.

The wheel $S^3$ is preferably about three inches in diameter, although it may vary from that, and it should be so placed that its tire or rim bearing against the strap will keep the inner faces of the latter normally in contact with each other for about half an inch above and half an inch below the line on which the yarn runs between them. The grip of the strap on the yarn is at its maximum when the position of the strap-guide $S^3$ is such as to cause the line on which the yarn is drawn to be midway of the curve on which the inner faces of the strap meet. The grip may be diminished by lowering the strap-guide from that position, and it is often desirable to change such grip. For this purpose the strap-guide is made vertically adjustable, the provision for this purpose in the present instance consisting of vertical slots U in the side plates, in which the axle of the strap-guide is adjustable and can be clamped in adjusted position, the strap-guide being loose and rotatable on its axle. The raising and lowering of the strap-guide is not always sufficient to modify to the desired extent the action of the meeting faces of the strap upon the yarn passing between them. Additional provision can be made for this purpose by making the axle of the tension-idler horizontally adjustable fore and aft of the spinning-frame, thereby intensifying or moderating the action of the straps, as the case may be. Means for such horizontal adjustment are shown in Figs. 16, 17, 17$^a$, consisting of cutting away the front upper portions of the side plates S and supporting the ends of the axle of the tension-slots, and the axle can be transferred from one slot to the other, as preferred, thus giving three horizontal adjustments to the wheel. The ends of the axle may, as shown in Figs. 17, 17$^a$, be eccentric to the body of the axle, thus subdividing the three adjustments above referred to and permitting of six adjustments in all. The effect of this change in the tension-idler upon the strap is indicated in Fig. 16, ($w$ $w'$ being the meeting faces of the strap,) where the tension-idler is represented in changed position in dotted lines. The modification of the meeting surfaces $w$ $w'$ due to this change is represented graphically in the small diagrammatic figure to the right of Fig. 16.

In lieu of a circular strap-guide I have used a quasi-elliptical strap-guide, such as shown in Figs. 10 and 10$^a$, consisting of two small grooved pulleys rotatable on stationary pins or axles, and a rubber ring of round cross-section and three-eighths inch diameter surrounding and slightly hugging them, the guide as a whole having a major axis of about two inches and a minor axis of about one and one-half inches and having opposite its major axis a curvature of larger radius than a three-inch circle. This device possesses some advantages in the way, for example, of economizing space, which is a material consideration in a machine of this character; but on the whole I prefer the circular strap-guide.

In order to secure the best results, the spinning-strap should be held under elastic tension. The rubber tires on the driving-pulley, tension-idler, and strap-guide serve this purpose; but other means may be employed, if desired.

The two side plates S, which are almost identically alike, constitute a box-like structure which incloses most of the operative parts of the spinning mechanism. The structure stands upright beside its appropriate doffer-ring, opposite to and partly in the interval between that ring and the one next adjoining. Those edges of the structure which directly confront the doffer are curved conformably to the latter, the structure thus serving as a protector to keep the product from said ring from interfering with or being interfered with by the product from any other of the rings, thus preventing different ends of yarn from running together into one, a thing sure to happen and to make a great deal of trouble frequently and to render the spinning machinery impracticable unless some proper separating means is provided.

Another feature of improvement is that each spinning-frame is movable out from and into its own proper working place independently of the others and without impeding the continuous working of the machine, thus permitting the operator while the spinning machinery is running to withdraw from working place any one or more of the spinning-frames to piece up broken ends and to remove clogging or other temporary defects in the working devices. Many means for thus moving each spinning-frame outward and inward independently of the others can obviously be employed without departure from the invention. The means I prefer to employ for this purpose are illustrated more particularly in Figs. 5ᵃ, 6, 6ᵃ, 6ᵇ, the spinning-frame being hinged to the foot S' by a hinge-pin consisting of a short half-inch screw V, with a head V' and a washer V², each about two inches in diameter, which screw extends through holes in the lower ends of the side plates S and that portion of the foot S' which projects between said plates and is drawn by the nut V³ on it, so as to clamp the side plates to the foot between the head V' and the washer V². In the foot S' is a slot V⁵, concentric with the axis of the hinge-pin, and through this slot passes a pin V⁴, which fits tightly in the screw-head V', washer V², and side plates S' and holds them together, so that they move as one. The slot limits the extent of forward and rearward movement of the spinning-frame, which swings on the pin V as an axis. Any suitable means can be employed for locking or latching the frame in its upright or operative position. In the present instance I employ means which automatically lock it in operative position, but which must be manipulated to unlock and withdraw it from that position. These means consist of a cam-lever V⁸, Figs. 5ᵃ, 6, pivoted to the spinning-frame at Y⁶ and free to swing on that pivot by its own weight. The lower end of the lever is a piece or shoe of hardened steel which rests and is jammed upon and against the pin V⁷ in the foot S' when the frame is in upright position, and thus locks the frame in that position. When it is desired to bring the frame back to the position indicated by dotted lines in Fig. 5ᵃ, the upper or handle end of the lever V⁸ is pushed forward by hand, thus removing the shoe V¹⁰ from the pin V⁷ and allowing the spinning-frame to be pulled backward by hand. When the frame is pushed forward again into working position, the lever automatically engages the pin V⁷ and locks the frame. The effect of swinging back the spinning-frame is to slacken the spinning-strap and stop its action, making it easy to remove the tension-idler or strap-guide for cleaning, oiling, or other purpose or to renew or repair the strap or to prepare or start an end or to piece up one which has broken down.

To facilitate the operation of starting or piecing up an end, the guide-eyes in the plates S, through which the end passes, are slotted, so as to be open from the inner edge of the plates, as seen at W in Fig. 6, the opening being sufficient to permit the passage of the device for drawing the yarn end through between the meeting faces of the strap. The device that I now use for the purpose is not a special implement, as in my aforesaid patent, No. 611,109, (which was needed when the guide-eyes were closed,) but is merely a thread or string which is inserted in between the faces of the spinning-strap and across the spinning-frame at the point marked V⁹ in Figs. 5ᵃ and 6, where the side plates S are cut away sufficiently to permit this. Holding the string in both hands and drawing it down between the faces of the strap, it will slide down upon the edges of the plates S, which confront the doffer, until it reaches the slots W, where it slips into the guide-eyes. This thread is now between the meeting faces of the strap, and when the latter moves the thread revolves with great rapidity, and a strand of yarn begins to gather and form on that end of it which is opposite the doffer-ring. By pulling on the other end of the string the end which the strand has formed will be drawn gradually into and through the spinning-frame, and at the proper time this strand is put into the action of the drawing mechanism and the making of the yarn proceeds.

In the making of ordinary yarn the short piece of thread or string used for this threading operation forms no part of the ultimate product; but in the manufacture in this machine of core-yarn composed of a previously-spun core and a fibrous envelop spun upon the core, as described and claimed in my application for a patent, Serial No. 135,157, filed December 13, 1902, I use the previously-spun yarn-core as the "threading" device in lieu of a separate short length of thread. I have illustrated in the drawings and shall hereinafter describe the few simple provisions required in order to adapt the machine to manufacture this core-yarn.

In making ordinary yarn it is not prudent to rely upon the spinning-straps alone to clean the doffer-rings of the fibrous material they deliver, because breakages of ends will occur frequently. In my prior patented machines accessories, such as combs or wipe-rolls, were used for this purpose. In lieu of these devices I now employ an instrumentality which while occupying comparatively little space is much more simple and efficient for the purpose and is productive of better results as concerns the quality of the yarn. This instrumentality consists of a needle and needle support or "shield," as I term it. (Best shown in Figs. 5, 5ᵃ, 7, 7ᵃ.) The needle T is connected to the shield proper, T', by a ball-and-socket joint on the outer face of the shield. The ball, which is on the head of the needle, is received in the socket, one-half of which is in the shield and the other half in a clamp T² on the outside of the shield and held thereto by the nut T³ and screw T⁴. The shank of the needle extends through and projects from the inner face of the shield. The needle is intended to extend about two-thirds across the doffer-ring, almost grazing the latter, pointing diagonally at an angle of about forty-five degrees downward toward the eye W in the spinning-frame to which the needle pertains, through which the yarn is drawn into the field of action of the meeting faces of the spinning-strap. The point of the needle should be a trifle nearer the doffer-ring than the rest of the needle is. When thus placed, the needle coöperates with the spinning-strap to clear the ring of fibrous material and to roll it up. It steadies and holds the fibrous roll thus formed, and the spinning-strap keeps the said fibrous roll as it forms continuously whirling around the needle, and the yarn in process of making appears to be constantly and continuously coming off from the point of the needle. The needle has the effect of straightening or laying out the fibers and of improving the quality of yarn produced. The shield is stiff and steady and both protects the needle from outside fiber and prevents the fiber delivered by the ring from running back on the needle too far, the inner face of the shield forming an effective barrier for this purpose. The needle must be set at different angles, according to the size of the yarn, the kind of fiber spun, and the speed of drawing the yarn. The joint between the needle and the shield, which gives a wide range of movement to the needle, admits of this adjustment being made easily, quickly, and accurately.

The form of the shield may vary; but that illustrated in Figs. 7, 7ᵃ is recommended. As there shown, it consists of the shield proper, T′, the base T⁶, and the shank T⁷, which connects the shield with the base. The shield T′ and base T⁶ are in parallel planes. The connecting-shank T⁷ is bent so as to stand at right angles to them, extending from the edge of one to the front edge of the other, giving the device a Z cross-section approximately. The base T⁶ is slotted, the slot being on a curve about concentric with the doffer, and through this slot passes the screw by which the shield is clamped to its appropriate spinning-frame, as seen in Fig. 5ᵃ. When the shield is thus clamped to the spinning-frame, the shank T⁷ is of such length that it will extend across and beyond the doffer-ring appropriate to the spinning-frame, thus placing the shield beyond the edge of the ring opposite that on which the spinning-frame is located—as shown, for example, in connection with the doffer-ring B³ in Fig. 5.

The edge of the shield proper, T⁶, next to the doffer should be curved conformably to the latter, or approximately so.

In the shield proper there is a longitudinal vertical slot whose entrance is at T⁵. This slot is used only when core-yarn is being made. The previously-spun yarn intended for the core is taken, say, from one of the balls X in Fig. 1 and through suitable guides is brought down to its appropriate shield and enters the slot in the shield proper through the "threading-opening" T. The yarn is passed spirally around the needle, (when the latter is retained,) which forms a good guide for the spun core, and thence it is threaded through the guide-eye in the next adjoining side plate of the spinning-frame. The needle, however, is not indispensable and can be removed. The disposition of the guide-eye and slot, however, is such that in that event the yarn will extend diagonally across the surface of the doffer-ring and will occupy substantially the same position relatively to the latter as has been already described for the needle, the core extending diagonally across and grazing the surface of its doffer-ring.

When core-yarn is to be made, it will be found convenient to arrange the spools from which the supply of spun yarn is drawn in two banks, as shown more particularly in Figs. 3 and 4. The twelve spools which supply the upper series of spinning-frames are indicated at X, Fig. 4, supported on a shelf X′, the yarn from them passing over suitable guides X² X³, &c., to their respective spinning-frames. The group of spools which supply the lower series of spinning-frames is seen at X⁴ contained in a sheltered support in the base of the machine, the yarns from them passing to their respective spinning-frames over suitables guides X⁶ X⁷, &c.

At X⁹ X⁹, Fig. 6, are represented auxiliary shields attached to the shield T, which I sometimes use in making core-yarn in order to afford additional protection to the spun-yarn core as it comes down to its spinning-frame.

In the drawings I have represented some of the spinning-frames as making core-yarn—as, for example, in Fig. 5 core-yarn is being made in connection with doffer-rings B² B³ and ordinary yarn in connection with rings B′. The cores may be either single or any number of ply; but doubled yarn is preferred. If single yarn is used, its twist ought to be opposite to that which is put into the fibrous envelop in spinning the latter upon its core, because otherwise the spinning-straps will take most of the twist out of the cores temporarily before they reach the straps, and this will so weaken the cores for the time being as to cause frequent breakages of ends. If yarn of two or more ply is used, it does not matter so much in which direction it is twisted, provided its single parts are twisted together into one strand slackly; but two-play yarn whose single parts have the twist opposite to that put in the fibrous envelop in spinning it and are twisted slackly into one strand is believed to be the best for the cores, because such cores will assist best in spinning their fibrous envelops upon them and will make the best cores for the completed yarn. The principle on which the core-yarn makes is as follows: When a strand of it is making, the action of the spinning-strap causes the core to revolve on the surface of the doffer-ring with great velocity, and this velocity is in inverse proportion to the diameter of the yarn. In other words, the finer the yarn the greater the velocity. It is not unusual for it to revolve ten thousand or twenty thousand or more times per minute. Hence the eye cannot see the mode of operation, except that it sees a fibrous roll continuously enveloping the core and clearing the doffer-ring of material and revolving with incomprehensible velocity. When a core is between the meeting faces of a spinning-strap, the strap puts into the core on one side of the spinning device a twist opposite to that which it puts into the same on the other side. Therefore the twist put in on the entering side is taken out on the exit side; but with the fibrous envelop it is different. Although it revolves in the same direction as that part of its core which it is enveloping for the time being, that part of the core which for the time being is in the remote ball does not revolve; but the rear end of the fibrous envelop revolves because it is loose. The fibrous envelop twists in but one way from start to finish, because the only end of it which is held from rotation is the end which is temporarily between the drawing-rolls. When the twist put into the core on the entrance side is taken out on the exit side, its action helps to twist and spin the fibrous envelop upon its core. When the core-yarn is completed, its core has the same kind and degree of twist as when it was in the original ball. The twist of the core changes twice while the core-yarn is making, once on its way from its original ball to the spinning-strap and again on its way from the spinning-strap to the drawing mechanism. During the latter change the fibrous envelop is spun upon its core and with the help of its core, and the twist of the fibrous envelop becomes wholly independent of the original and final twist of the core and is actually opposite to the twist of the single parts of which the core is composed when the preferred core is used.

In order to screen the forming-yarn and the portions of the doffer-rings adjacent for the time being to the spinning-frames, I may provide screens which are secured to the spinning-frames and confronting the doffer-rings, these screens being wide enough to fill the space between the shields proper, T', and their respective spinning-frames. One of such screens is shown at Y in Figs. 5, 5ª, and 6. It is a thin strip of sheet metal or other suitable material about as wide as or a little wider than the doffer-ring which it confronts, is curved on an arc approximately concentric with the ring, and may, if desired, contain a transparent window Y', preferably of isinglass, to admit of seeing the forming-yarn. It is held between the shield proper, T', and the adjacent side of its spinning-frame between pairs of pins $y\ y'$, which form guides between which the screen may be moved up and down at will.

As thus far described, the spinning-frames are individually adjustable or movable both lengthwise of and to and from the ring-doffer with which they are associated. It may be desirable at times to provide means by which they may be adjusted to and from the doffer bodily and together as one group. To this end the girder on which they are mounted is made thus adjustable, it being preferred that it should for this purpose be capable of turning in its bearings and of being secured in its adjusted position. The arrangement preferred for this purpose is illustrated in Fig. 11. The body Q of the girder has detachable ends Q', one of which is shown in Fig. 11. The end Q' is bolted to the body Q by a bolt $Q^2$, on which the body Q can turn as on an axis or center by slightly loosening the bolt and adjusting the set-screws $Q^3$. The end Q' has a journal extension fitting a hole in the side frame C, the journal being shorter than its bearing, and the girder as a whole can swing on this journal as an axis and when adjusted can be clamped in place by bolt $Q^5$, which passes through a washer exceeding the journal in diameter and screws into a threaded hole formed axially in the end of the journal, as plainly illustrated in Fig. 11.

I also provide means by which the spinning devices are made reversible—that is to say, each of them is as suitable for spinning yarn from one side as from the other side of a doffer-ring. When yarn is spun from the left-hand side, it has left-hand twist and when spun from the right-hand side it has right-hand twist. The advantages of being able to make yarn of either twist at will with one and the same set of spinning devices, as may be done with those here provided, are manifest. The side plates of the spinning-frames are practically alike, and so far as the frames are concerned all that is needed is to provide means by which they may be shifted at will to one or the other side of the doffer-rings. Provision for this is made in the present instance by the employment of a hinged collar $Q^4$, (shown partly in dotted lines in Fig. 1,) which fits on the journal extension at one end of the girder between a shoulder thereon and the adjoining side frame C. When the collar is taken off, the girder can be moved lengthwise to the left, so as to bring the shoulder on the journal extension up against the side frame, in which event there will be left on the journal extension at the opposite end a place for the collar, to which it can be transferred and then clamped between the journal-shoulder and the side frame at that end. Thus the girder can be moved lengthwise in either direction a distance equal to the thickness of the hinged collar, and the collar should be made just thick enough to admit of moving the girder lengthwise sufficiently to transfer the spinning-frames from the doffer-rings on their one side to the doffer-rings on their other side. For example, if the intervals between the doffer-rings are nineteen-sixteenths of an inch wide and each spinning-frame occupies ten-sixteenths of an inch of this interval the hinged collar on the girder should be nine-sixteenths of an inch thick.

The spinning-shaft E, on which are mounted the driving-wheels E' of the several spinning-straps, is, similarly to the girder, made longitudinally adjustable, so that the wheels E' carried by it can conform to the change in position of the spinning-frames, as will be understood without further explanation. It will be also noted in this connection that the spinning-shafts E are adjustable vertically, as well as fore and aft. The castings P P', on the shelves of which the boxes of the shafts rest, are adjustable vertically, while the boxes are adjustable fore and aft on the shelves, as indicated in Fig. 11, where one of the boxes is broken away to show the fore and aft slot in the shelf, through which passes the bolt that binds the box to the shelf.

I also arrange for the reversibility of the needle-shields as well. The needle-shield, as shown in Fig. 7, is of symmetrical shape, so that it may either be clamped to the right-hand side plate of the spinning-frame, as shown in Fig. 5, on the frame beside the ring $B^3$ or be turned over end for end and be clamped to the left-hand side plate of the frame or on the frame beside ring $B^4$. In both of these cases core-yarn is represented as being made, drawn in the one case from the left-hand side of the doffer-ring and in the other case from the right-hand side of the doffer-ring. In these two cases the needle is dispensed with; but the needle can be employed when desired, and its changed position when the needle-shield is reversed is shown by dotted lines in Fig. 7. The same clamp and screw which hold the needle where it is shown in full lines in Fig. 7 will serve equally well to hold it in its changed position.

I come now to that portion of my improvements which relates to the drawing devices and which may be stated to consist in the combination, with each of the ring-doffers and the spinning devices and guides accompanying it, of special drawing mechanism to draw the yarn being made, comprising a power-driven under roll parallel to the doffer, a row of upper rolls axially in line with each other, rotatable independently of each other, appropriated, respectively, to the strands of yarn to be drawn, with an open space at one end of each, and parallel and in near proximity to and adapted to be driven by the under roll, and means whereby the upper rolls may be adjusted readily to any desired proximity to the under roll and be held at such proximity by a yielding or springy pressure which may be increased or diminished at will. This drawing mechanism is useful for drawing yarn and roving elsewhere than in said combination, in which alone it is claimed here. General protection therefor is sought in my separate application, filed in the United States Patent Office November 20, 1903, Serial No. 181,965. Formerly the winding mechanism was depended upon by me to draw the yarn, as well as to wind it, and my Patent No. 611,109 lays special stress upon the utility of a long stretch between the outlet of the spinning device and the mechanism for drawing; but wider experience since has taught that the winding mechanism alone is not reliable to draw the yarn at uniform rate of speed, and it is deemed difficult, if not impracticable, to locate special drawing mechanism close to the winding mechanism. Uniform rate of speed is indispensable to the production of even yarn, and hence is more important than the long stretch. The drawing mechanism here set forth is, so far as I am aware, the only drawing mechanism now known in the art suitable for producing yarn directly in connection with the ring-doffers and said spinning mechanism. Figs. 6, 12, 13, 14, and 15 show enough to illustrate a system of it, and Fig. $5^a$ shows it in said combination. The rolls are fluted on the principle of gear-cutting. The under roll H' runs in the boxes $H^2$, which are adjustable inward and outward on the castings $H^3$, being clamped thereto by screws which extend through oblong slots in the boxes. The castings $H^3$ are adjustable in the transverse direction on the side frames C in a similar manner. The angle-iron $H^4$ is firmly clamped to said boxes by screws, as shown. An intermediate journal in the roll H' runs in a bearing $H^5$, which is fastened to said angle-iron by any suitable means. There may be as many such intermediate journals and bearings as desired. Only four of the upper rolls $H^6$ are shown in Fig. 15; but when the machinery of which the system is a part is in full operation there are as many of them in each system as there are doffer-rings on the doffer with which the system coöperates, each of the upper rolls being appropriated to a corresponding doffer-ring and spinning device. The entire system is seen to be adjustable bodily inward and outward and lengthwise from side to side. The lengthwise adjustment, which is of sufficient range to adapt the drawing-rolls to the reversing of the spinning-frames, is to bring the middle of each upper roll into proper position to draw the strand of yarn which it is its business to draw, and the inward and outward adjustment is to put the system nearer to or farther from the spinning devices, as the case may be. The upper rolls are shell-rolls running independently of each other on axles, preferably of brass, for easy running and economizing in the use of grease. They are in pairs, and H⁷ represents the brass piece containing two axles for a pair. How the shell-rolls are held on their axles against shoulders by means of washers sunk into recesses in the rolls and screwed to the ends of the axles is sufficiently shown in Figs. 6, 12, and 14 without need of saying more. Each of the pieces H⁷ is grasped tightly by the two halves of a grasping device consisting of the parts H⁸ and H⁹, hinged together at $h$, as shown in Fig. 13. The part H⁸ is hinged at $h'$ to the casting $h^2$, which is screwed down and fastened firmly to the angle-iron H⁴. On the outer or graduated part of the lever H⁹, which may be regarded as a lever of the second order, whose fulcrum is at $h$, is hung a weight $h^3$. The entire grasping device may be regarded as a lever of the first order, fulcrumed at $h'$. The weight acts doubly, both to hold up away from the under roll the piece H⁷ as far as it can go and at the same time to hold that piece down by a yielding pressure as near the under roll as it can go. The proximity of the shell-roll to the under roll is determined or adjusted by means of the set-screw $h^4$. Turning the set-screw one way brings the shell-roll nearer the under roll, while turning it the other way carries it farther therefrom. The under roll drives the shell-roll as one gear drives another. However fast the rolls run it involves no personal danger, and it is perfectly simple and easy to put a strand of yarn coming from a spinning device down upon the under roll through the open space shown at one end of the appropriate shell-roll, steer it into its proper place, and let it go of its own accord into the action of the drawing mechanism. A spring may be used on the graduated end of the lever instead of the weight, as indicated by dotted lines in Fig. 13. The device $h^5$ is a clearer to prevent yarn from winding around the under roll or fiber from gathering on it. Said drawing mechanism helps to enable the operator to piece up broken ends easily while the machinery is running.

The yarn is preferably wound in cheese form. In order to prevent the tubes upon which the yarn is wound from slipping around or lengthwise of their supporting-mandrels while the yarn is winding, I provide each mandrel with an automatically-acting detent, which will be engaged with or disengaged from the tube, according to the direction of rotation of the latter, this detent, (shown in Figs. 8, 8ª,) of a thin-pronged sheet-metal plate $n'$, fitting loosely in a slot cut into and crosswise of the mandrel $n$ and connected to the mandrel by a pin $n^2$, fast to the mandrel and entering a diagonal slot $n^3$ in the detent, so as to permit the plate a limited movement by which its prongs will be retracted or projected from the mandrel, as the case may be. The detent is shown in its normal position in full lines in Fig. 8ª, its prongs protruding beyond the periphery of the mandrel slightly, but not enough to prevent the tube (which fits it loosely) from being slipped over it. If the tube be revolved in the direction of the arrow in Fig. 8ª, (the direction contrary to that in which the prongs point,) it will catch on the prongs, with the result of causing the detent to move on the pin $n^2$ until the prongs are protruded from the mandrel and are driven into the tube to such an extent that it cannot slip on the mandrel. The mandrel, with the tube mounted thereon, should be put in its appropriate winding-guides in such relation to its winding-drum that the latter will cause the tube to revolve in the direction of the arrow in Fig. 8ª. To remove the tube from the mandrel, it is only necessary to reverse the direction of movement.

Having described my improvements, what I claim herein as new, and desire to secure by Letters Patent, is as follows:

1. In machinery for making yarn from fibrous materials the combination with means for carding the material, doffer-rings to continuously subdivide the carded material definitely and on predetermined lines into numerous narrow and independent sections, and means to operate said rings; of spinning devices, means to supply spun yarn to said spinning devices and to guide the same across, and in close proximity to, their respective doffer-rings, whereby the fibrous material from said doffer-rings is rolled up around the previously-spun yarn as a core, and drawing devices to which the composite strands pass from the spinning devices, and by which they are continuously drawn, as they form, lengthwise of themselves into strands of core-yarn composed severally of a previously-spun core and a fibrous envelop evenly surrounding and spun upon the core, substantially as hereinbefore set forth.

2. In machinery for making yarn from fibrous materials, the combination of the following elements—means for carding the material; doffer-rings, and means for operating the same, to subdivide the carded material; power-driven spinning-straps; means to supply spun yarn and to conduct the same to the several spinning-straps across and in close proximity to the surfaces of their respective doffer-rings whereby the carded subdivisions from the rings are rolled upon spun yarn as a core and in this condition pass to and between the meeting faces of their appropriate spinning-straps, and mechanism to draw said subdivisions and spun yarn together, all acting simultaneously and coöperating continuously to produce from said material and spun yarn numerous strands of core-yarn, substantially as hereinbefore set forth.

3. In machinery for making yarn from fibrous materials, the combination with means for carding the material, of doffer-rings to subdivide the carded material; power-driven straps to condense and spin the subdivisions, with their meeting faces on short curved areas to intensify their action upon the material and moderate their action upon each other; and mechanism to draw the spinning-subdivisions, all acting simultaneously and coöperating continuously to produce numerous strands of yarn from the material, substantially as hereinbefore set forth.

4. In machinery for making yarn from fibrous materials, the combination with means for carding the material, of ring-doffers to subdivide the carded material; power-driven straps slightly in, and tangentially confronting, the intervals between the doffer-rings to condense and spin the subdivisions, with their meeting faces on short curved areas to intensify their action upon the material and moderate their action upon each other; and mechanism to draw the spinning-subdivisions, all acting simultaneously and coöperating continuously to produce numerous strands of yarn from the material, substantially as hereinbefore set forth.

5. In a spinning device substantially such as herein described, for acting conjointly with drawing mechanism and a doffer-ring to spin and draw into yarn directly from the ring the material it delivers, the combination with a condensing and spinning strap and its driving-pulley, tension-idler and yarn-guides, and means for supporting said parts and actuating said pulley, of a strap-guide pressing against the outer surface of the strap, with its surface curved lengthwise of the strap and causing the inner faces of the strap to meet together at a predetermined place on a curved area to intensify the action of said meeting faces upon the fibrous material and moderate their action upon each other, and means to support such strap-guide, substantially as hereinbefore set forth.

6. In a spinning device substantially such as herein described, for acting conjointly with drawing mechanism and a doffer-ring to spin and draw into yarn directly from the ring the fibrous material it delivers, the combination with a condensing and spinning strap and its driving-pulley, tension-idler and yarn-guides, and means for supporting said parts and actuating said pulley, of a strap-guide pressing against the outer surface of the strap and causing the inner faces of the strap to meet together at a predetermined place, with its surface continuous and moving with the strap to support the strap behind the whole length of the area on which its inner faces meet and to eliminate heating action on the outer surface of the strap, and means to support such strap-guide, substantially as hereinbefore set forth.

7. In a spinning device substantially such as herein described, for acting conjointly with drawing mechanism and a doffer-ring to spin and draw into yarn directly from the ring the fibrous material it delivers, the combination with a condensing and spinning strap and its driving-pulley, tension-idler and yarn-guides, and means for supporting said parts and actuating said pulley, of a strap-guide pressing against the outer surface of the strap and causing the inner faces of the strap to meet together at a predetermined place, with its surface convex or ridged in cross-section to bear upon the strap harder along its middle length than elsewhere and cause said meeting faces to be more yielding along their edges than elsewhere and lessen resistance to the entrance and exit of the fibrous material to and from the action of said meeting faces, and means to support such strap-guide, substantially as hereinbefore set forth.

8. In a spinning device substantially such as herein described, for acting conjointly with drawing mechanism and a doffer-ring to spin and draw into yarn directly from the ring the fibrous material it delivers, the combination with a condensing and spinning strap and its driving-pulley, tension-idler and yarn-guides, and means to support said parts and actuate said pulley, of a strap-guide pressing against the outer surface of the strap and causing the inner faces of the strap to meet together and locating their position, means to adjust the strap-guide and thereby vary the position of said meeting faces relatively to the line whereon the fibrous material is guided between them, and means to support such strap-guide, substantially as and for the purposes hereinbefore set forth.

9. In machinery for making yarn from fibrous materials, the combination with means for carding the material, of doffer-rings to subdivide the carded material; power-driven straps to condense and spin the subdivisions, with their meeting faces on short curved areas to intensify their action on the material and moderate their action on one another; means to maintain said straps under elastic tension; and mechanism to draw the spinning-subdivisions, substantially as and for the purposes hereinbefore set forth.

10. The combination with the spinning-frame, the spinning-strap, and its driving-pulley, strap-guide and tension-idler, of the fork in which the tension-idler is supported, and the adjusting-screw engaging the fork and having its bearing in the frame, substantially as and for the purposes hereinbefore set forth.

11. In a spinning device substantially such as herein described, for acting conjointly with drawing mechanism and a doffer-ring to spin and draw into yarn directly from the ring the fibrous material it delivers, the combination with the condensing and spinning strap and its driving-pulley, strap-guide and tension-idler, of means to adjust horizontally the tension-idler, and thereby either intensify or moderate the action of the meeting faces of the strap upon the material for the time being between them, substantially as hereinbefore set forth.

12. In a spinning device substantially such as herein described, adapted to stand opposite to and partly in the interval between any two adjacent doffer-rings of a ring-doffer and to coöperate with one of them and withdrawing mechanism to spin into yarn from that ring the fibrous material it delivers, supporting and protecting side plates whose edges confronting the doffer are curved conformably to the shape of the doffer to render the spinning device a separator between said two rings, substantially as and for the purposes hereinbefore set forth.

13. In yarn-making machinery substantially such as herein described, reversible spinning devices to coöperate with the doffer-rings of the carding-machine and withdrawing mechanism to spin and draw into yarn directly from said rings the carded fibrous material they deliver, having frames whose right-hand side plates are substantially like their left-hand side plates respectively, and adapt each to stand opposite to and partly in the interval between any two of the rings adjacent to each other and to be shifted from one ring to the other at will, to spin the material either from the right-hand side of one of the rings into yarn of one direction of twist, or from the left-hand side of the other into yarn of the opposite direction of twist, substantially as and for the purposes hereinbefore set forth.

14. In yarn-making machinery substantially such as herein described, the combination with each ring-doffer and its accompanying spinning devices and drawing mechanism, of means to swing said spinning devices in one body toward or away from the doffer on either or both of two different centers and to move them in one body from right to left and from left to right, while they are connected to their means of support, substantially as and for the purposes hereinbefore set forth.

15. In yarn-making machinery substantially such as herein described, the combination with each ring-doffer and its accompanying spinning devices and drawing mechanism, of means whereby each of the spinning devices, while still remaining connected to its means of support, may at will, independently of the others and while the others are in their proper working places and spinning, be readily moved out from, and then again into, its own proper working place, to facilitate the operator's working the machinery, his piecing up ends and his remedying temporary defects, substantially as and for the purposes hereinbefore set forth.

16. In yarn-making machinery substantially such as herein described, the combination with each of its spinning devices, of means to fasten its frame to its foot movably, to admit of moving the one on the other at will, means to stop said frame from moving farther than its working place toward the doffer, and means to lock said frame at its working place and to unlock it at will therefrom, substantially as and for the purposes hereinbefore set forth.

17. In yarn-making machinery substantially such as herein described, the combination with each of its spinning devices, of means to clamp and hinge its frame to its foot, to admit of swinging the one on the other at will, means to stop said frame from swinging farther than its working place toward the doffer, and means to lock said frame at its working place and to unlock it at will therefrom, substantially as and for the purposes hereinbefore set forth.

18. In a spinning device substantially such as herein described, for acting conjointly with drawing mechanism and a doffer-ring to spin and draw directly from the ring the fibrous material it delivers, the combination with its condensing and spinning strap and mechanism for operating and sustaining the strap, of yarn-guides located respectively at the side entrance to and exit from the place between the meeting faces of the strap, and provided with side openings through which string or yarn may be entered into the guides, substantially as and for the purposes hereinbefore set forth.

19. In yarn-making machinery substantially such as herein described, the combination with each of the doffer-rings, of a power-driven condensing and spinning strap to condense and spin the fibrous material as delivered by the ring and as drawn between the meeting faces of the strap, a needle to graze the surface of the ring and point toward the place where the material enters between said meeting faces, a shield to which the needle is adjustably connected and means for holding the needle in its adjusted position, and a support to which the shield is secured, substantially as hereinbefore set forth.

20. In yarn-making machinery substantially such as described, the combination with a spinning-frame and its power-driven spinning-strap, and the doffer-ring with which said strap coöperates, of a needle to graze the surface of the ring and point toward the place where the fibrous material from said ring enters between the meeting faces of the strap, a shield to which the needle is adjustably secured, and which in turn is adjustably secured to the spinning-frame, substantially as and for the purposes hereinbefore set forth.

21. In yarn-making machinery substantially such as herein described, the combination with each of the ring-doffers and its accompanying spinning devices, of a set or system of drawing-rolls parallel to the doffer to draw the fibrous material away from the doffer-rings and into and away from the action of the spinning devices, comprising a power-driven under roll and a row of upper rolls axially in line with each other, rotatable independently of each other, appropriated respectively to the strands of yarn to be drawn, with an open space at one end of each, and parallel and in near proximity to, and adapted to be driven by the under roll, and means whereby said upper rolls may be adjusted readily to any desired proximity to the under roll and be held at such proximity, substantially as and for the purposes hereinbefore set forth.

22. In yarn-making machinery substantially such as herein described, the combination with the doffer-rings, the spinning devices and the drawing mechanism, of screens located beside the spinning devices, confronting the rings and covering the yarn in process of forming across the surface of the rings, to screen the forming yarn and the portions of the rings adjacent for the time being to the spinning devices beside said portions respectively, and to keep loose fiber from flying and lodging on the yarn spun and on the machinery, substantially as and for the purposes hereinbefore set forth.

23. In yarn-making machinery substantially such as herein described, the combination with the ring-doffers and their respective accompanying spinning devices and drawing-rolls and means for adjusting the upper rolls to, and holding them at, any desired proximity to their respective under rolls, of means to adjust each system of the drawing mechanism lengthwise and fore and aft of the rolls, substantially as and for the purposes hereinbefore set forth.

24. In yarn-making machinery substantially such as herein described, the combination with the ring-doffers and their accompanying spinning devices and drawing mechanism, of means to adjust vertically and lengthwise and fore and aft the shafts of the driving-pulleys of the condensing and spinning straps of the several spinning devices, substantially as and for the purposes hereinbefore set forth.

25. In a spinning device substantially such as herein described, the combination with its condensing and spinning strap, tension-idler and strap-guide, of a driving-pulley bearing a rubber tire for driving the strap, means for sustaining said parts and means for actuating said pulley, substantially as and for the purposes hereinbefore set forth.

26. In a spinning device substantially such as herein described, the combination with its condensing and spinning strap, tension-idler and driving-pulley, of a strap-guide having a continuous curved and rubber-tired bearing movable with the strap, means for sustaining said parts and means for actuating said pulley, substantially as and for the purposes hereinbefore set forth.

27. In a spinning device substantially such as herein described, the combination with its condensing and spinning strap, driving-pulley and strap-guide, of a tension-idler bearing a rubber tire, means for sustaining said parts and means for actuating said pulley, substantially as and for the purposes hereinbefore set forth.

In testimony whereof I have hereunto set my hand this 27th day of October, 1903.

WILLIAM HENRY DRURY.

Witnesses:
    HORACE TOBEY,
    JAMES E. WHITNEY.